United States Patent [19]

Ouimet et al.

[11] Patent Number: 4,654,860
[45] Date of Patent: Mar. 31, 1987

[54] SPACECRAFT TELEMETRY REGENERATOR

[75] Inventors: George R. Ouimet, Bothell; Raymond L. Cherry, Kent, both of Wash.

[73] Assignee: The Boeing Company, Seattle, Wash.

[21] Appl. No.: 504,967

[22] Filed: Jun. 16, 1983

[51] Int. Cl.[4] .................................................. H04J 3/00
[52] U.S. Cl. ............................................. 375/4; 370/84; 370/97
[58] Field of Search ............... 375/4, 118; 370/84, 370/112, 108, 97; 340/870.14; 328/164

[56] References Cited

U.S. PATENT DOCUMENTS

| | | | |
|---|---|---|---|
| 2,750,566 | 6/1956 | Westcott et al. | 332/9 R |
| 3,497,625 | 2/1970 | Hileman et al. | 332/22 |
| 3,546,684 | 12/1970 | Maxwell et al. | 340/825.22 |
| 3,573,625 | 4/1971 | Schmitz et al. | 29/56.6 |
| 3,660,606 | 5/1972 | De Witt | 370/42 |
| 3,707,604 | 12/1972 | Greefkes et al. | 370/58 |
| 3,708,786 | 1/1973 | Hardin et al. | 52/309.15 |
| 3,804,987 | 4/1974 | Cooper | 370/84 |
| 3,925,619 | 12/1975 | Freethy | 179/6.3 R |
| 3,934,093 | 1/1976 | Thyselius | 370/84 |
| 3,982,077 | 9/1976 | Clark et al. | 370/84 |
| 3,987,251 | 10/1976 | Texier et al. | 370/84 |
| 3,988,544 | 10/1976 | Texier et al. | 370/84 |
| 4,071,701 | 1/1978 | Leijonhufvud et al. | 370/84 |
| 4,072,923 | 2/1978 | Siems et al. | 340/857 |
| 4,074,074 | 2/1978 | Boutmy et al. | 370/112 |
| 4,105,973 | 8/1978 | Arnold et al. | 370/57 |
| 4,117,661 | 10/1978 | Bryant, Jr. | 375/107 |
| 4,135,156 | 1/1979 | Sanders, Jr. et al. | 370/57 |
| 4,152,545 | 5/1979 | Gilbreath, Jr. et al. | 375/23 |
| 4,201,892 | 5/1980 | Schmidt | 370/97 |
| 4,204,093 | 5/1980 | Yeh | 370/97 |
| 4,330,856 | 5/1982 | Takasaki et al. | 370/102 |
| 4,332,026 | 5/1982 | Alvarez, III et al. | 370/104 |
| 4,381,562 | 4/1983 | Acampora | 370/97 |
| 4,488,293 | 12/1984 | Haussmann et al. | 370/84 |
| 4,553,247 | 11/1985 | Harris | 370/97 |

*Primary Examiner*—Douglas W. Olms
*Assistant Examiner*—Kenneth I. Rokoff
*Attorney, Agent, or Firm*—Finnegan, Henderson, Farabow, Garrett & Dunner

[57] ABSTRACT

Individual data bit streams which have been merged into a telemetry stream are regenerated in their original format and at their original data rates by storing frames of the telemetry streams in a buffer, moving the data bits in the frame buffer which are from each merged individual data bit stream to a corresponding individual data bit stream buffer and forming from each individual data bit stream buffer, an output data stream at the same rate and in the same data format as the corresponding individual data bit stream.

28 Claims, 12 Drawing Figures

64 KBPS TELEMETRY FORMAT

WBDI DATA FORMAT

SPACECRAFT TELEMETRY REGENERATOR

The government has rights in this invention pursuant to Contract F04701-79-C-0089 awarded by the U.S. Air Force.

BACKGROUND OF THE INVENTION

This invention relates to the field of digital demultiplexers and telemetry reformaters and specifically to the use of such reformaters with satellite and spacecraft ground stations. The 1980s' mark the beginning of the Shuttle era in spaceflight. The Shuttle Space Transportation System provides regularly scheduled launches from a reusable manned vehicle designed for low earth orbit. Two of the chief purposes of the Shuttle are to provide a frequent system of transporting payloads into space and to minimize the time needed to put payloads into space.

In this application, the term "payload" includes both packages which return to the earth with the Shuttle and satellites released from the Shuttle. The present invention is described with regard to satellites and spacecraft, but the inventive concept applies to payloads generally and also to certain non-Shuttle data and telemetry systems.

Satellites and spacecraft on the Shuttle either have orbits similar to the Shuttle's or have orbits or paths which require an additional boost. For satellites with orbits similar to the Shuttle's, the satellite is removed from the Shuttle at the appropriate time and placed into the proper orbit. If the satellite and the Shuttle have sufficiently different paths, for example the satellite is destined for a geosynchronous orbit or the spacecraft for an interplanetary path, then an Interim Upper Stage (IUS) is currently envisioned to provide the needed boost.

The currently-envisioned IUS, which can support up to four different satellites, has its own guidance system, data processor and communications equipment. The IUS can transmit data, either encrypted or unencrypted, from the payloads to a ground station and relay commands and data from the ground station to the payloads.

The planned use of the IUS and the Shuttle for transporting payloads has caused NASA and aerospace industry to reevaluate certain practices they have used since the early days of spaceflight, particularly the normal method of routing and processing satellite or spacecraft data during testing, launch and flight.

The most common procedure for testing a satellite or spacecraft during its integration is to design and use a specialized ground test station (GTS) which, among other things, receives and decodes the telemetry stream generated by a satellite or spacecraft to examine certain data in that stream.

FIG. 1 is a block diagram showing GTS 10 connected to a satellite or spacecraft 20 during integration. Typically, GTS 10 has a data processor which is programmed to decode the telemetry stream and to perform any analysis necessary for the satellite or spacecraft data to be examined.

Satellite or spacecraft data is seldom available during launch. When it is, it is usually part of the booster rocket telemetry stream. To examine the satellite or spacecraft data in the booster rocket telemetry stream, Ground Station (GS) 30, seen in FIG. 2, must be designed to decode the booster rocket telemetry stream directly or to communicate with the booster rocket GS 40. FIG. 2 illustrates these different data paths and facilities.

Since neither the booster rocket telemetry stream nor the data link from the booster rocket ground station is in the same format and at the same bit rate as the satellite or spacecraft telemetry stream, the satellite or spacecraft GS must be designed differently from the satellite or spacecraft GTS and new software must be written and tested to examine satellite data during launch.

Once separated from the booster, the satellite or spacecraft transmits its own telemetry stream to the earth. In the past, this telemetry stream was received by various tracking stations around the world which received the satellite's or spacecraft's telemetry stream and either transmitted that stream to the satellite or spacecraft GS or tape recorded that stream for later shipment to the satellite or spacecraft GS.

The telemetry stream received by the GS is usually not at the same bit rate or in the same data format as either the original stream or the booster rocket telemetry stream, so another software package must be written and tested for the satellite or spacecraft GS.

This need for multiple systems and multiple software packages to follow a satellite or spacecraft from integration to flight is unacceptable in the Shuttle era. Such a procedure is not only expensive, it requires a great deal of time, and a procedure requiring such a large expenditure of time and money is inconsistent with the purposes of the Shuttle.

The telemetry regenerator of this invention eliminates the requirement for the different GS and GTS software and hardware design and is compatible with the IUS telemetry streams as well as the Shuttle telemetry streams.

The IUS is capable of outputting two telemetry streams, shown in FIG. 3 as the IUS TMA stream and the IUS TMB stream. These two streams are outputted at either 64 Kbps or 16 Kbps. The IUS telemetry streams are formed by merging data streams from up to four individual satellite or spacecraft data bit streams with data from the IUS computers.

Each IUS telemetry stream is divided up into frames. FIGS. 4 and 5 show the frame format for the 64 Kbps and the 16 Kbps IUS telemetry streams, respectively.

As shown in FIG. 3, the Shuttle provides two different systems for telemetering payload data to ground. The first is an S-band link which can route two payload data streams of up to 64 Kbps directly to the ground. The ports of the S-band link can either be connected to either one of the IUS input streams, to satellites carried by the IUS, or to another payload.

The Shuttle also provides a Wideband Data Interleaver (hereafter and in FIG. 3, WBDI) for transmitting to earth telemetry stream of payload data up to 256 Kbps. The frame format for a WBDI telemetry stream is shown in FIG. 6. The WBDI data stream is formed by merging several payload data streams. When an IUS is flown in the Shuttle, both the IUS TMA and TMB streams can be inputted to the WBDI as can the telemetry streams from each of satellites or spacecraft on the IUS.

To prevent the necessity of multiple GTS and GS systems, the telemetry regenerator of this invention regenerates the satellite or spacecraft data bit streams on the ground in the same format and at the same bit rate as they are outputted by the satellite or spacecraft, regardless of the paths that the data in those streams have followed in being sent to ground. When a satellite or spacecraft is flown with an IUS on the Shuttle, there are several different ways that satellite or spacecraft data can be received by the satellite ground station:

1. From the unattached satellite or spacecraft or through the S-Band link (no regeneration of data needed).
2. As part of the IUS TMA (direct transmission through the Shuttle S-Band link).
3. As part of the IUS TMB (direct transmission through the Shuttle S-Band link).
4. As part of the IUS TMA stream which is in turn part of the WBDI stream.
5. As part of the IUS TMB stream which is in turn part of the WBDI stream.
6. As part of the WBDI stream directly.

An object of this invention is to regenerate the data streams merged into the Shuttle and/or IUS data streams such that data streams are available on the ground having the same data, at the same bit rate and in the same format as those outputted from the satellites.

Another object of the present invention is to regenerate those data streams even though the bit rates of the original data streams are not known precisely or are changing.

Yet another object of the invention is to regenerate those data bit streams without outputting any filler or "trash" data bits.

Additional objects and advantages of the present invention will be set forth in part in the description which follows and the part will be obvious from that description or may be learned by practice of the invention. The objects and advantages of the invention may be realized and obtained by the methods and apparatus particularly pointed out in the appended claims.

SUMMARY OF THE INVENTION

The device of this invention to regenerate individual data bit streams each having a particular data format and bit rate, which have been merged into a telemetry data stream having frames comprises: a frame buffer; means for storing in the frame buffer the frames of the telemetry data stream which are inputted to the device; a plurality of individual data bit stream buffers each corresponding to a different one of the individual data bit streams; means for sending from the frame buffer to each of the individual data bit stream buffers the data bits in the stored frames which were from the individual data bit stream corresponding to that bit stream buffer; and means for forming, for each of the individual data bit stream buffers, an output data stream having the same data format and the same bit rate as the corresponding individual data bit stream, thereby to regenerate the individual data bit streams merged into the telemetry data stream.

Another device according to this invention to regenerate individual data bit streams, each having a particular data format and bit rate, which have been merged into a telemetry data stream having frames comprises: a plurality of frame buffers, each corresponding to a different individual data bit stream; means for storing in each of the frame buffers those data bits in the telemetry data stream frames from the individual data bit stream corresponding to that frame buffer; and means for forming for each of the frame buffers an output data stream having the same data format and the same bit rate as the corresponding individual data bit stream.

The method of this invention for regenerating individual bit streams, each having a particular data format and bit rate, which have been merged into a telemetry data stream having frames which include data bits from the individual data bit streams comprises the steps of: storing, in a frame buffer, the frames of the telemetry data streams; sending, from the frame buffer to a plurality of individual data bit stream buffers, each corresponding to a different one of the individual data bit streams, the data bits in said stored frames from the individual data bit stream corresponding to that individual data bit stream buffer; and forming, for each of the individual data bit stream buffers, an output data stream having the same data format and the same bit rate as the corresponding individual data bit stream, thereby to regenerate the individual data bit streams merged into the telemetry data stream.

The accompanying drawings, which are incorporated in and which constitute a part of this specification, illustrate one embodiment of the invention and, together with the description, explain the principles of the invention.

DESCRIPTION OF THE PREFERRED EMBODIMENT

Reference will now be made in detail to a presently preferred embodiment of the invention, an example of which is illustrated in the accompanying drawings.

Figure 7:
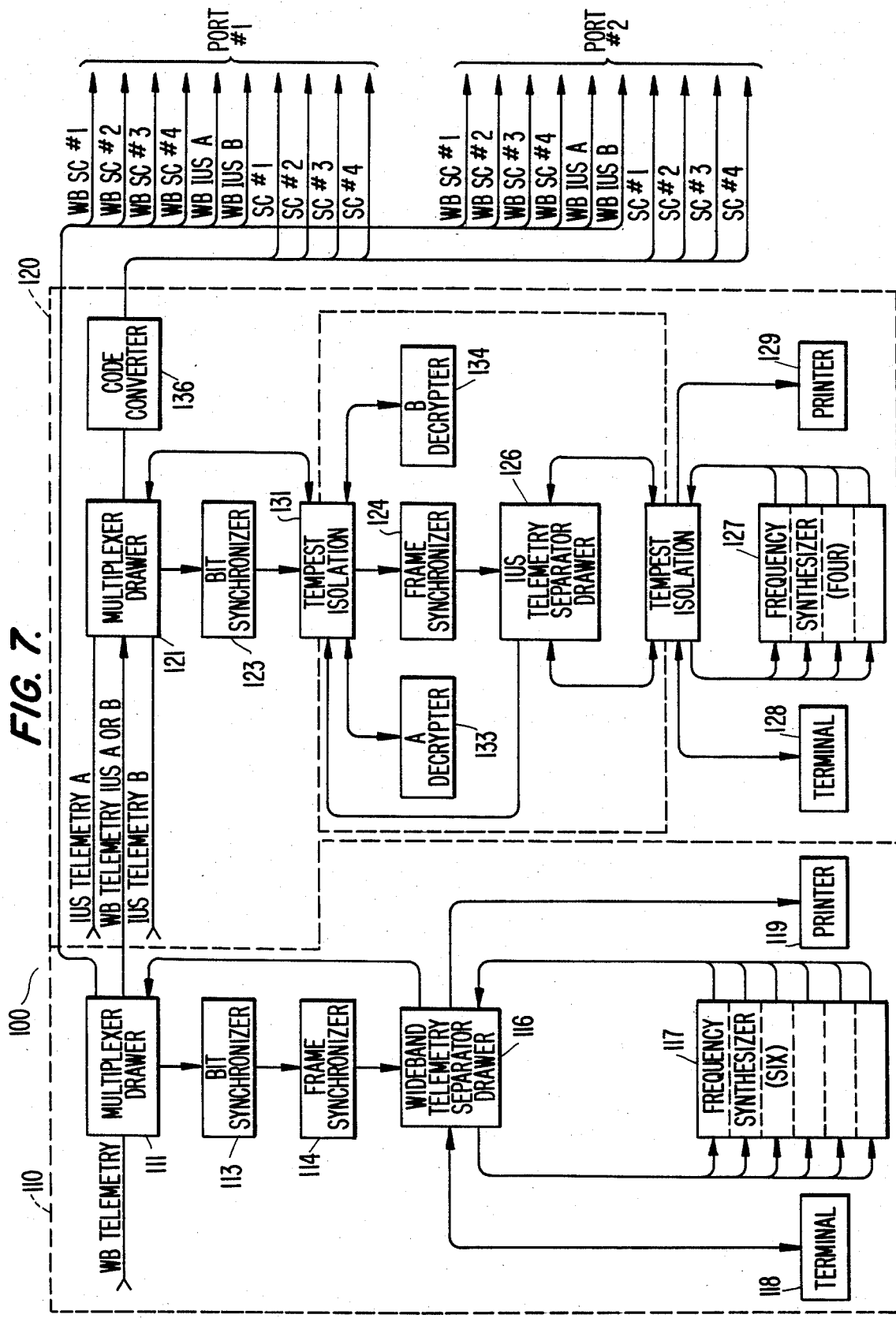
FIG. 7 is a block diagram of a telemetry regenerator system according to this invention.

FIG. 7 shows a block diagram of a spacecraft telemetry regenerator according to the present invention. The telemetry regenerator 100 of this invention will regenerate satellite or spacecraft data inputted into the IUS or into the Shuttle. Telemetry regenerator 100 actually comprises two regenerators: a wideband telemetry regenerator 110 for regenerating the data streams merged by the WBDI and an IUS telemetry regenerator 120 for regenerating the data bit streams merged to form the IUS telemetry stream. The operation of telemetry regenerator 100 will be described by explaining the operation of regenerators 110 and 120 which can operate either independently or with each other.

In the telemetry regenerator in FIG. 7, there are three different sources of an IUS telemetry stream into IUS telemetry regenerator 120: the received IUS TMA stream, the received IUS TMB stream, or an IUS telemetry stream which has been regenerated by wideband telemetry regenerator 110 (shown in FIG. 7 as the WB Telemetry IUS A or B stream). IUS Telemetry regenerator 120 in FIG. 7 only uses one telemetry stream at a time so the three inputs feed multiplexer drawer 121 which is responsible for routing the data to the correct location.

The detailed functioning of multiplexer drawer 121 will be explained by reference to FIG. 8 which is a data flow diagram for IUS telemetry regenerator 120.

The IUS TMA stream (121a), the IUS TMB stream (121b) and the WB TM IUS A or B stream (121c) all feed multiplexer drawer 121. Multiplexer drawer 121, which is under the control of the IUS telemetry separator drawer 126, selects one of those streams to be outputted to bit synchronizer 123 on line 123a.

In the preferred embodiment, the telemetry stream on line 123a sent from multiplexer drawer 121 to bit synchronizer 123 is in biphase-L format. Bit synchronizer 123 first ensures that IUS telemetry regenerator 120 is in phase with the bits in the telemetry stream inputted to the bit synchronizer and then converts that stream into an NRZ-L data stream on line 123b plus a clock on line 123c.

The NRZ-L telemetry stream and clock are sent into tempest isolation drawer 131. This drawer's purpose is to protect the security of any classified data in the IUS telemetry streams. Tempest isolation drawer 131 provides Red/Black data isolation which ensures that any classified data in the IUS telemetry steam is not accessible outside of the tempest isolation. Such isolation may be required, for example, for Defense Department satellites or spacecraft. Those elements which are secure lie inside of heavy dotted line in FIG. 7 and to the left of isolation drawer 131 in FIG. 8.

As a further security measure, the IUS telemetry stream may be encrypted. If it is, then the synchronized and converted telemetry stream from bit synchronizer 123 is sent via lines 123a and 123b to tempest isolation drawer 131 on lines 133a and 133b to A decrypter 133 or on lines 134a and 134b to B decrypter 134. Both decrypters are shown in FIGS. 7 and 8.

The decrypters output the decrypted IUS telemetry stream, which is either on lines 133c and 133d for the A decrypter or on lines 134c or 134d for the B decrypter, through tempest isolation drawer 131 to frame synchronizer 124. Decrypters 133 and 134 (not part of the telemetry regenerator 120 hardware) only decrypt the IUS telemetry stream. If a satellite or spacecraft data stream is encrypted before it is merged into the IUS telemetry stream decrypters 133 and 134 will not decrypt it.

Frame synchronizer 124 receives, via data and clock lines 124a and 124b, a decrypted telemetry stream from either decrypters 133 and 134 or directly from bit synchronizer 123. Frame synchronizer 124 establishes and maintains synchronization between the IUS telemetry regenerator and the frames of the inputted telemetry stream by looking for the unique frame sync code in every IUS telemetry stream frame. For the IUS telemetry streams this code is in the same location in each frame of an IUS telemetry stream. It occupies the first six words of the 64 Kbps telemetry format shown in FIG. 4 and the first four words of the 16 Kbps telemetry format shown in FIG. 5. After frame sychronizer 124 locates the desired code, it continues to search for the frame sync code in the same location of the succeeding frame (i.e., every 160 words for the 64 Kbps frame or every 80 words if in the 16 Kbps format).

Figure 8:
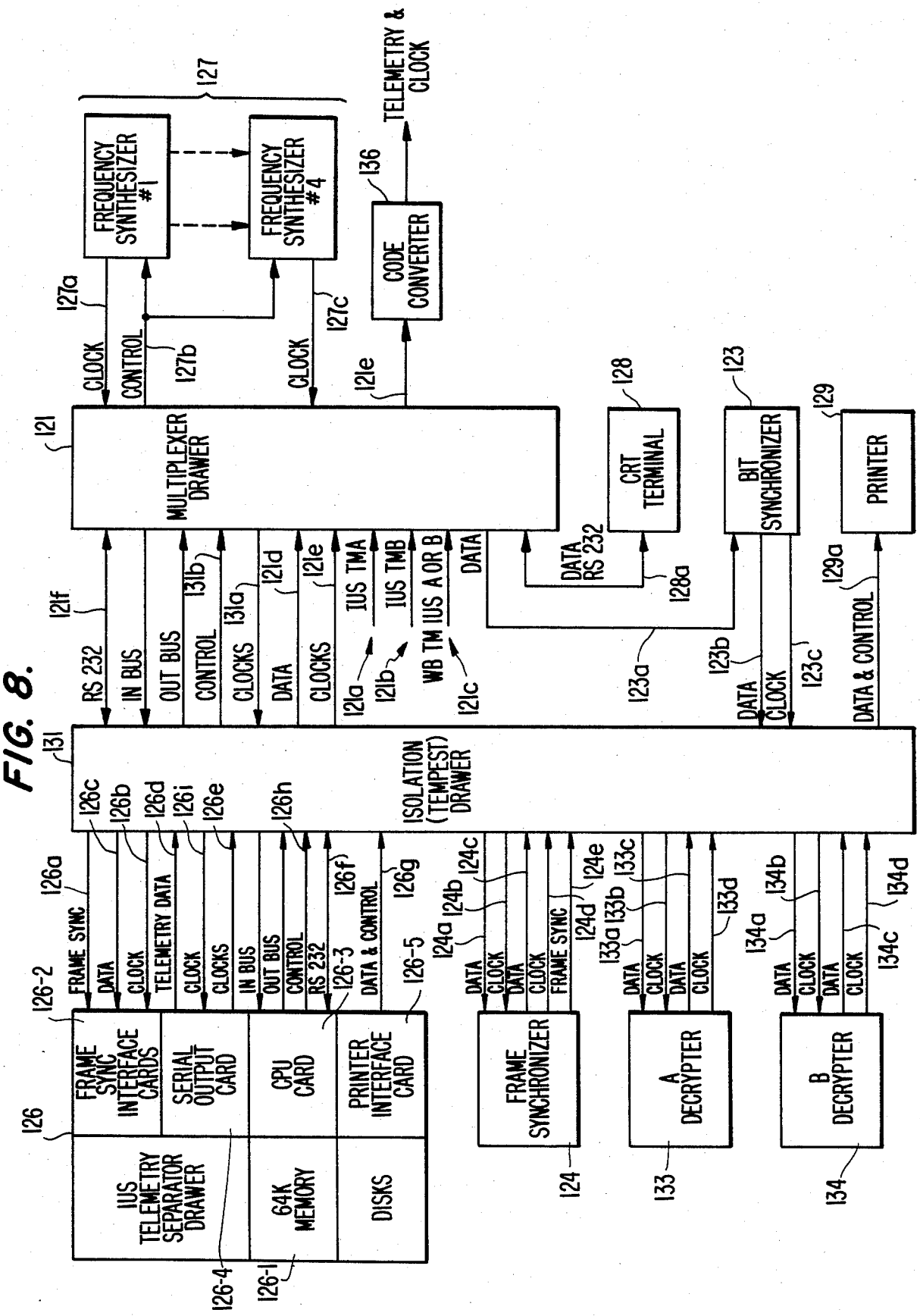
FIG. 8 is a detailed block diagram for an IUS telemetry regenerator of the telemetry regenerator system in FIG. 7.

Frame synchronizer 124 outputs the frame sychronized telemetry data, clock, and frame sync signal, on lines 124c, 124d and 124e, respectively, through isolation drawer 131 to IUS telemetry separator drawer 126 shown in FIGS. 7 and 8.

Figure 9:
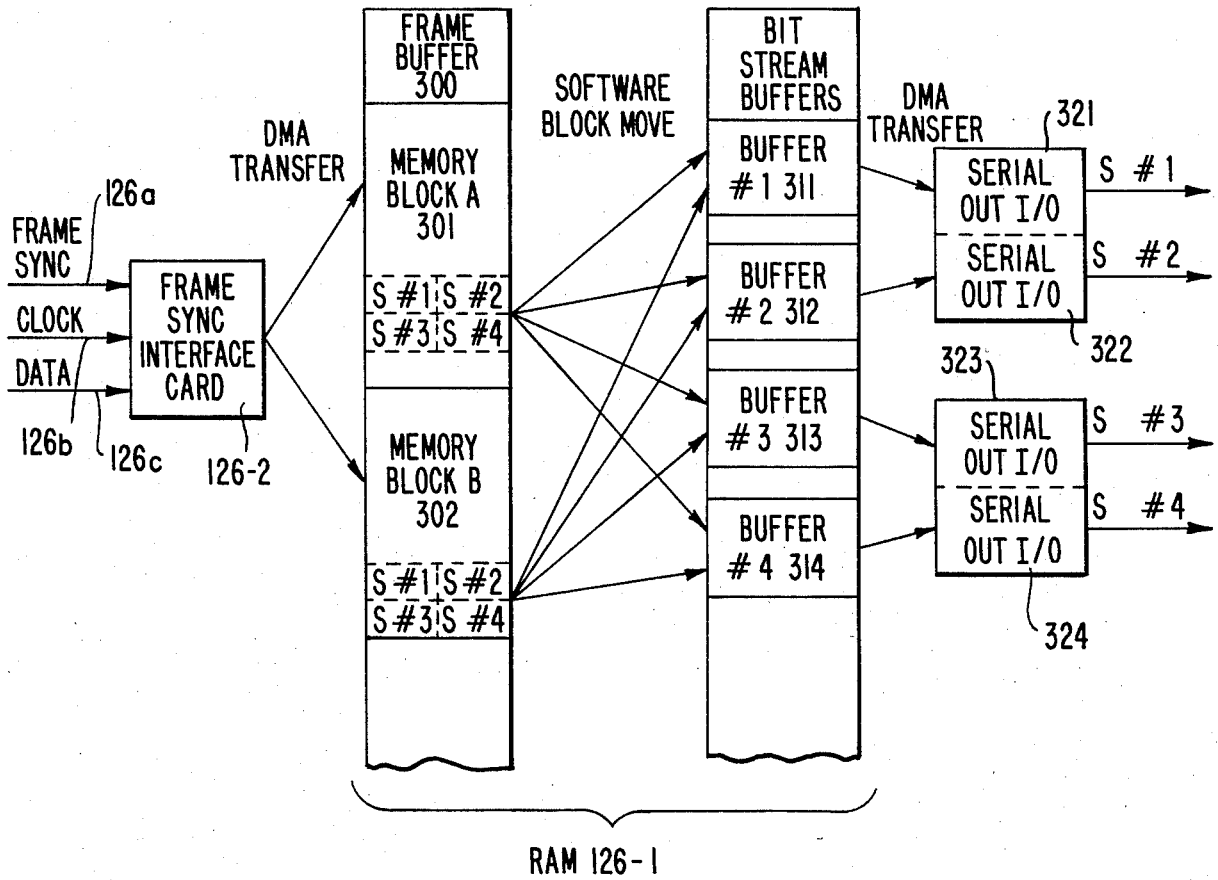
FIG. 9 shows the storage of IUS telemetry frames in the memory of the IUS telemetry regenerator in FIG. 8.

In the preferred embodiment of this invention IUS telemetry separator drawer 126 includes 64 thousand words of random access memory (RAM) shown as 126-1 in FIG. 8. A portion of this memory is used to store the frames of the IUS telemetry stream data received from frame synchronizer 124. FIG. 9 shows this portion of RAM 126-1. RAM 126-1 contains a frame buffer 300 which is shown in FIG. 9 as including memory blocks 301 and 302.

In accordance with the present invention, the telemetry regenerator includes means for storing in the frame buffer the frames of the telemetry data streams which are inputted to the regenerator. In the preferred embodiment, this means includes frame sync interface card 126-2 shown in FIG. 9 and in FIG. 8 as part of IUS telemetry separator drawer 126. The frame sync interface card 126-2 receives the frame sync signal on line 126a, the telemetry data on line 126c and the clock on 126b from frame synchronizer 124 via tempest isolation drawer 131. When the frame sync signal is received, interface card 126-2 initiates a direct memory access (DMA) transfer to store the next frame of IUS telemetry data in one of the two memory blocks in frame buffer 300.

After one memory block is filled with a frame of telemetry data, the satellite or spacecraft data from that block is transferred as described below and the other memory block is filled. The use of two buffers prevents the loss of telemetry data.

Figure 1:
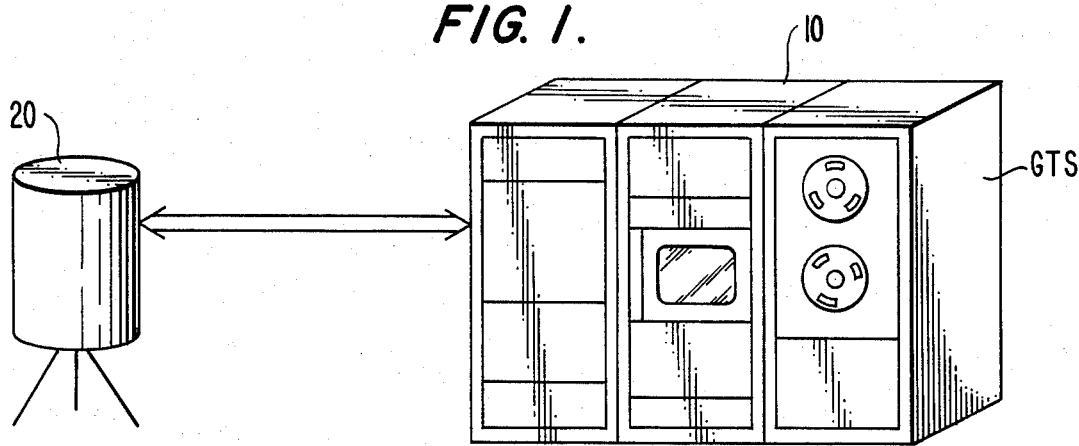
FIG. 1 is a block diagram showing a ground test station connected to a satellite during satellite integration.
Figure 2:
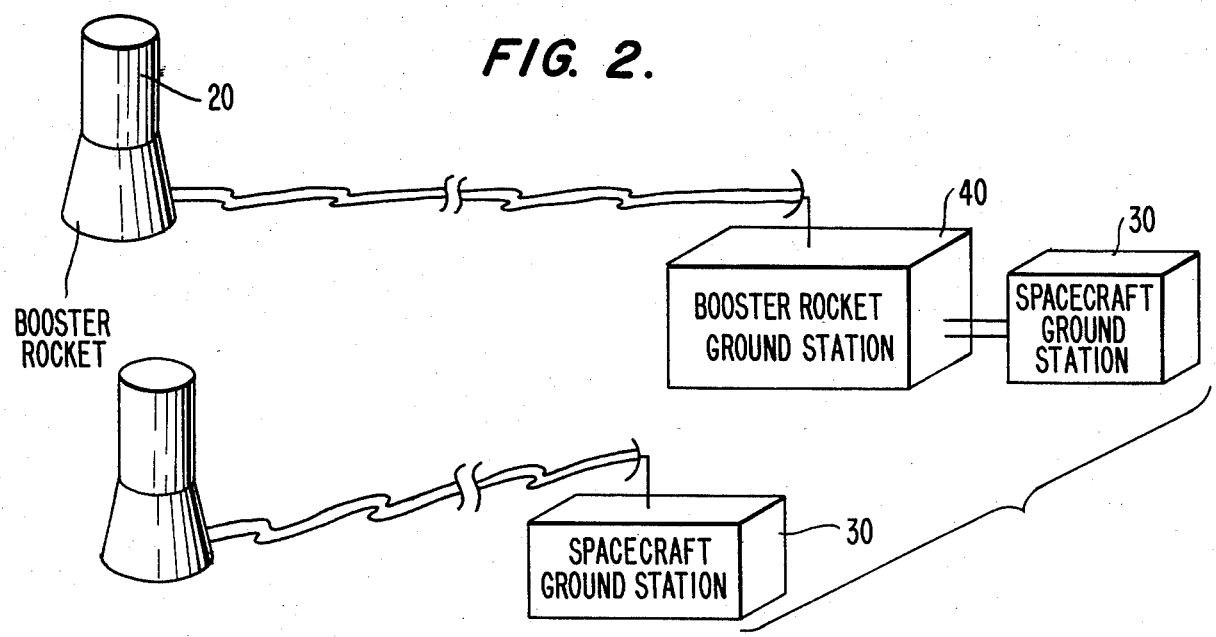
FIG. 2 shows possible data paths from a satellite to a satellite ground station.
Figure 3:
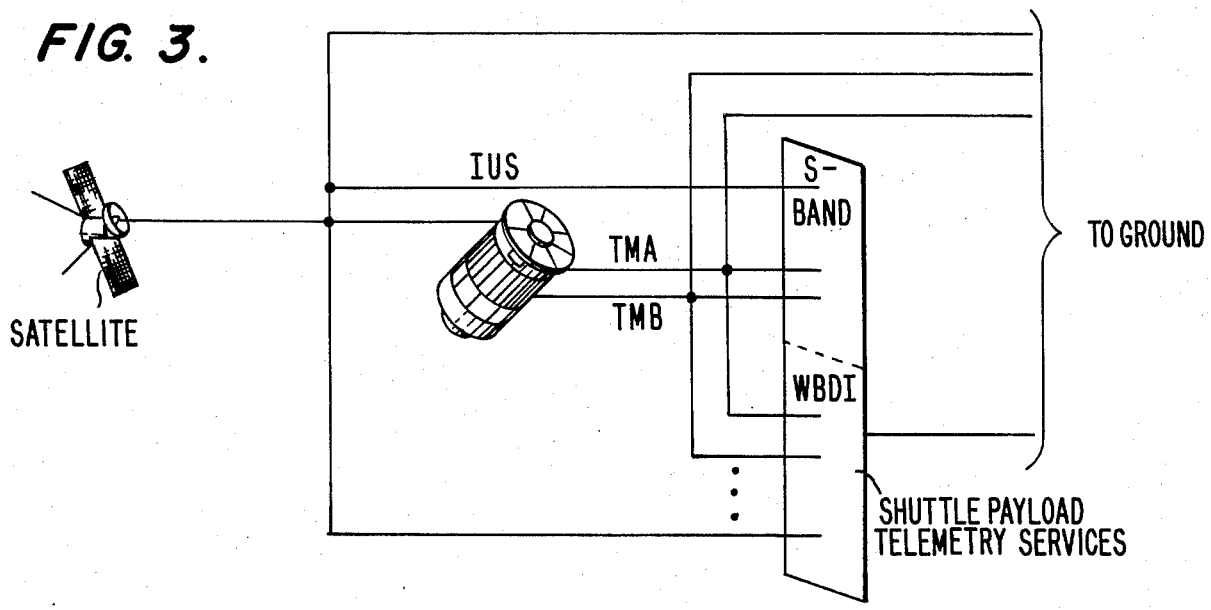
FIG. 3 shows different paths for satellite data through the IUS and through the Shuttle.
Figure 4:
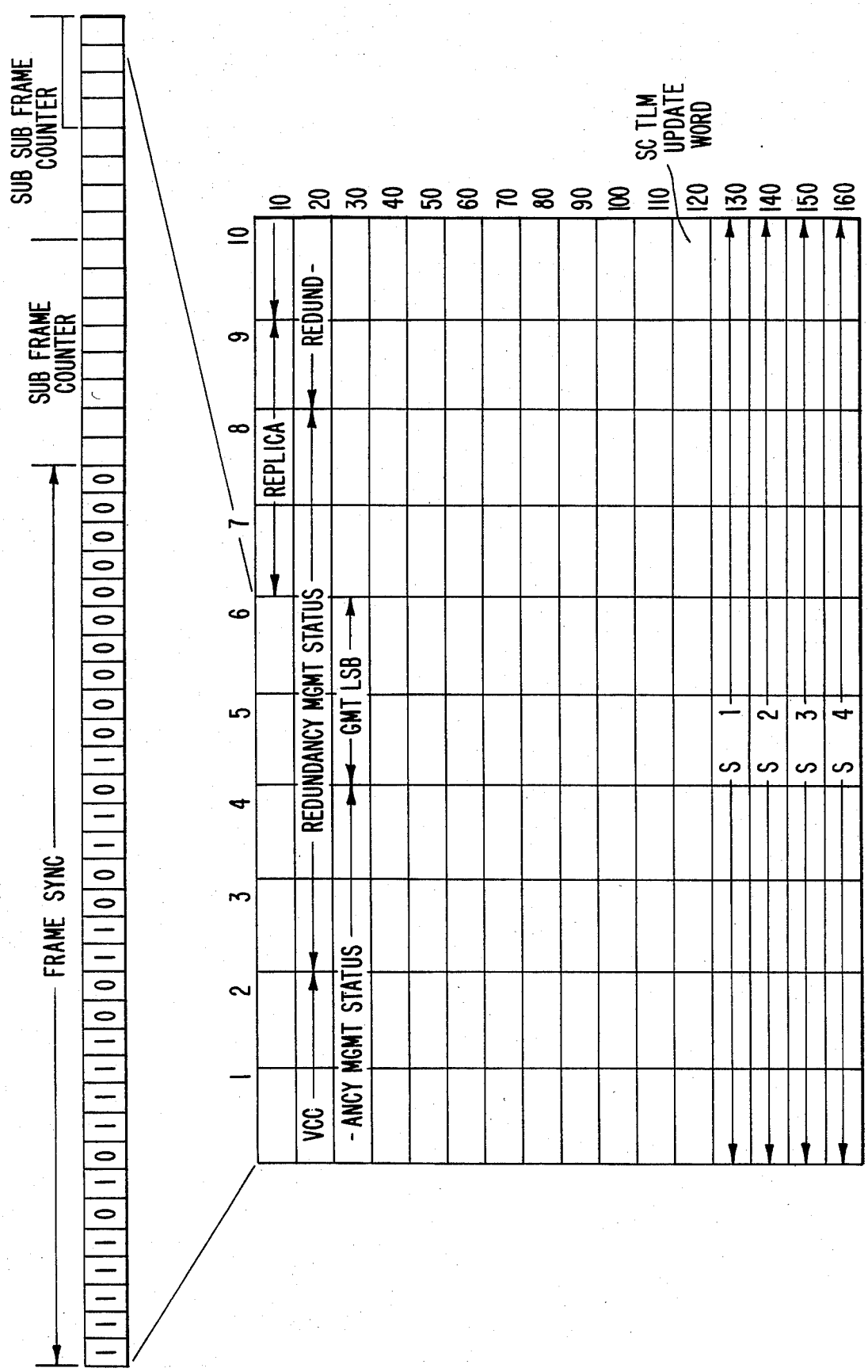
FIG. 4 shows the format for the 64 Kbps IUS telemetry stream frames.
Figure 5:
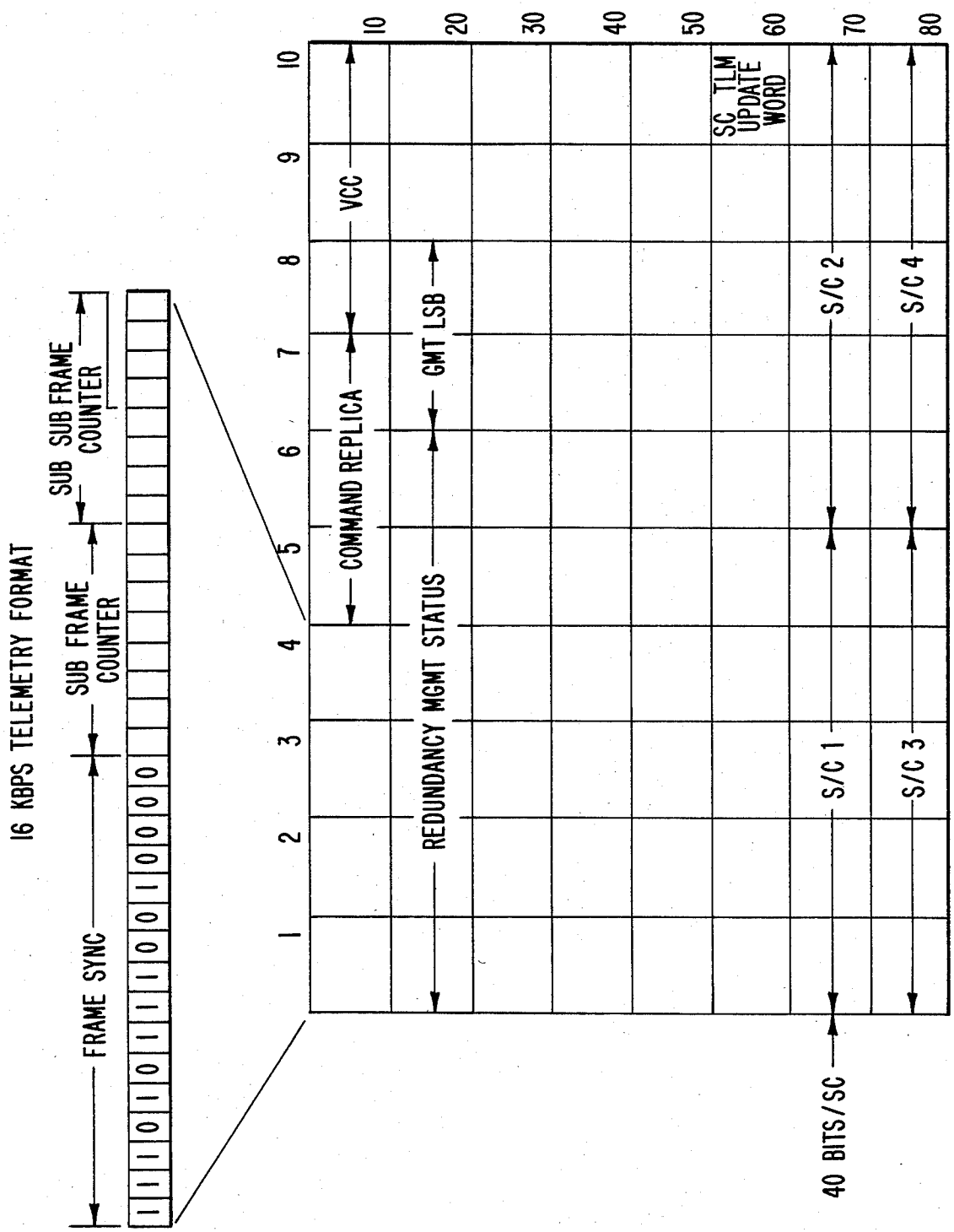
FIG. 5 shows the format for the 16 Kbps IUS telemetry stream frames.

Each memory block can contain a frame of IUS telemetry data. The different portions of each memory block correspond to the different words in the IUS telemetry frames. As seen in FIG. 4, each 64 Kbps telemetry frame can contain in words 121–160 ten (10) words of data from each of four satellite or spacecraft telemetry streams. In the 16 Kbps data format seen in FIG. 5, each frame can include in words 61–80 five (5) words for each of four satellite telemetry streams. When an IUS telemetry frame is stored in a memory block, its words containing the satellite or spacecraft data are memory block area S #1 through S #4 which each correspond to a different block of words in the IUS telemetry streams.

As seen in FIG. 9, RAM 126-1 also includes several individual spacecraft bit stream buffers 311–314, each corresponding to the different telemetry streams which had been merged into the IUS telemetry stream. Each spacecraft bit stream buffer is a recirculating type buffer meaning that the buffer is filled sequentially and after the last position in the buffer is filled, the next position to be filled is the first position of the buffer.

The present invention includes means for sending from the frame buffer to each of the individual spacecraft bit stream buffers data bits in the stored frames which were from the spacecraft telemetry stream corresponding to that buffer. CPU 126-3, seen in FIG. 8, is part of IUS telemetry separator drawer 126 and, in the preferred embodiment of the IUS telemetry regenerator 120, transfers words from the memory blocks 301 and 302 in frame buffer 300 to satellite bit stream buffers 311-314. Each memory block area S #1 through S #4 in memory block 301 (also memory block 302) FIG. 9 corresponds to a different spacecraft bit stream buffer 311-314, so CPU 126-3 moves words under software control from a memory block area to a corresponding spacecraft bit stream buffer.

Specifically, CPU 126-3 first determines whether the data in each frame is valid. As indicated above, when the IUS forms a frame of telemetry data, it places into each frame a set number of words of data received from a particular spacecraft telemetry stream. If that stream has not provided new or sufficient data for a frame the IUS will determine that the data from that stream is invalid, then, although each IUS telemetry stream has the set number of words of data from the particular stream, the data in the frame from the stream is flagged as invalid. In the preferred embodiment, the CPU determines the data by checking an update word in the stored telemetry frame, which is word 120 in the 64 Kbps format shown in FIG. 4 and word 60 in the 16 Kbps format in FIG. 5. The update words indicate whether the words in the IUS telemetry frame which are associated with a particular satellite's or spacecraft telemetry contain valid data. If those words do not contain valid data, then the CPU does not transfer the words to the spacecraft bit stream buffers. This avoids the necessity of transmitting filler or trash bits in the absence of valid data.

The data in the spacecraft bit stream buffers remains in the same format as it was originally sent to the IUS from the satellite. The telemetry regenerator processes the frames in the order received from the IUS and transmits the words in the frame buffers to the spacecraft bit stream buffers in the order in which those words were filled in the IUS frames, so the format of the data in the spacecraft bit stream buffers is the same as the corresponding telemetry stream format.

Figure 10:
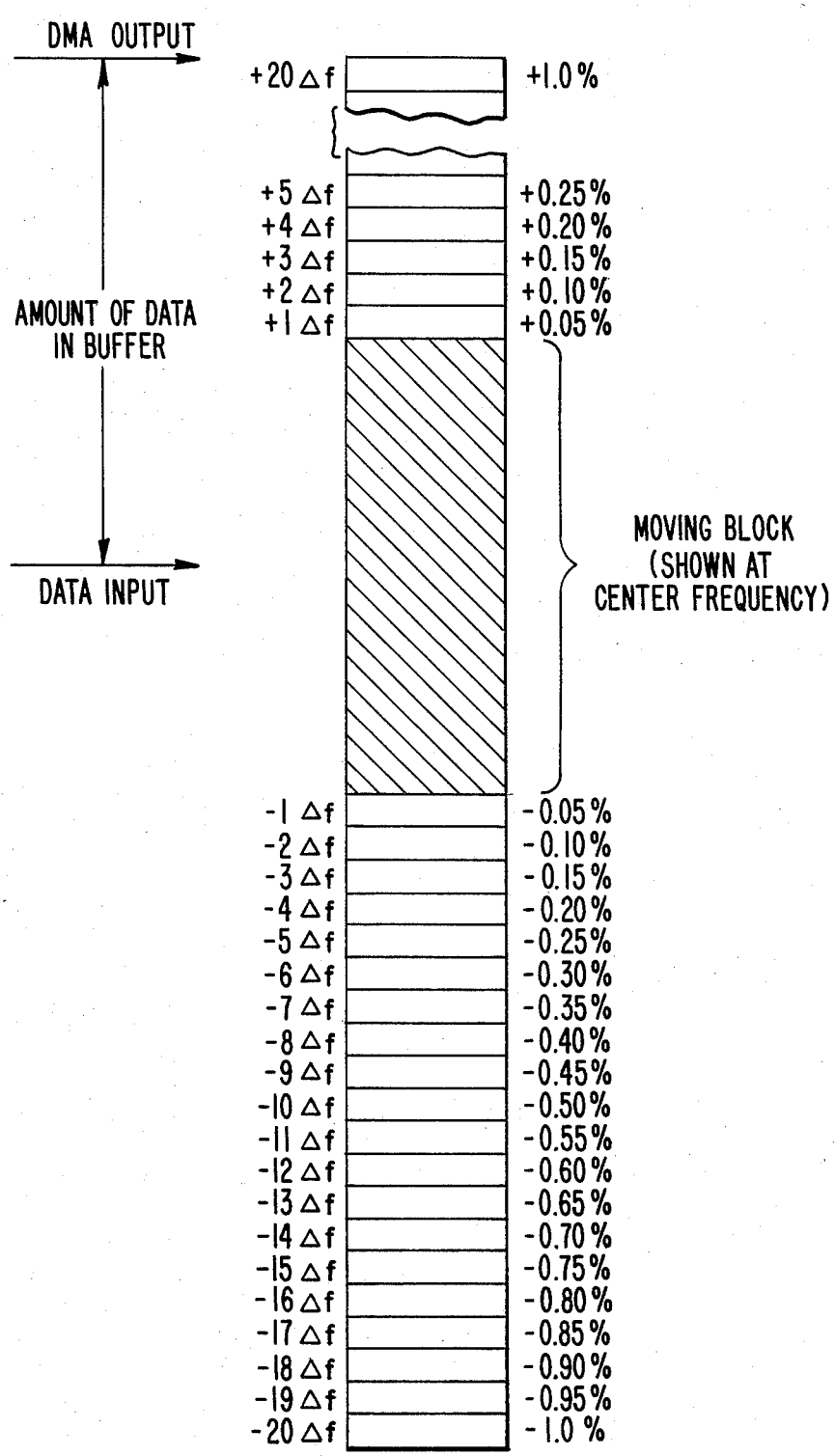
FIG. 10 shows a frame buffer in the IUS telemetry regenerator in FIG. 8.

A detailed example of a satellite bit stream buffer is shown in FIG. 10. The buffer has an input pointer to the location in the buffer where the next word is going to be stored. This pointer is labelled Data Input in FIG. 10 and is typically an address word either stored in RAM 126-1 or in a special register in separator drawer 126.

The buffer in FIG. 10 also has an output pointer to the next location of the buffer whose content is to be outputted. This is shown in FIG. 10 under the words DMA OUTPUT and is also typically an address word stored in memory or in a buffer. The working size of the buffer is the number of words between the input pointer and the output pointer. The data words in the buffer are outputted when the buffer reaches a certain size. In the preferred embodiment, data words are first outputted when the buffer is half full.

In accordance with the present invention, the telemetry regenerator includes means for forming, for each of the spacecraft bit stream buffers, an output data stream having the same data format and the same bit rate as the corresponding individual data bit stream. In the embodiment of the invention shown in FIGS. 8 and 9, the data in the spacecraft bit stream buffers is outputted by serial output cards 126-4 shown as part of the IUS telemetry separator drawer 126 in FIG. 8 and as elements 321-324 in FIG. 9. In the embodiment of the invention shown in FIG. 9, each serial output card contains two serial output channels and each channel corresponds to one of the spacecraft bit stream buffers.

To form the output data streams, serial output cards 126-4 initiate DMA transfers of the words in the corresponding bit stream buffers. The clock for outputting each buffer is supplied by frequency synthesizers 127 shown in FIGS. 7 and 8. The four frequency synthesizers shown in FIGS. 7 and 8 each correspond to a different spacecraft bit stream buffer and therefore, to a different satellite or spacecraft telemetry stream.

Each frequency synthesizer generates a clock intended to be at the data bit rate of the corresponding satellite or spacecraft telemetry stream. The clock signals are sent to multiplexer drawer 121 over signal lines 127a, 131a and 126i.

If the frequency synthesizer clock differs from the data bit rate of the corresponding individual data bit stream, then the size of the individual data bit stream buffer will change due to the different input and output rates. A buffer size increase means that the frequency synthesizer clock is slower than the rate of the corresponding incoming telemetry stream and when the buffer size decreases, the frequency synthesizer clock is operating faster than the incoming telemetry bit rate. The buffer in FIG. 10 shows graphically how each increase in the buffer size translates into a frequency differential (shown as $\Delta f$'s).

IUS telemetry separator drawer 126 shown in FIG. 8, and in particular, CPU 126-3 in that drawer, monitors the contents of each buffer. If the buffer changes size by more than a predetermined amount, CPU 126-3 sends correction signals via control lines 126h, 131a and 127b to the corresponding frequency synthesizer to adjust the clock frequency and thereby compensate for any changes in the buffer content. Even if the bit rate of an individual data bit stream is not known precisely, or if the rate changes due to lack of precision in the satellite or spacecraft clock, the telemetry regenerator of this invention can correct the output data stream bit rate accordingly.

The output data streams and their associated clocks are outputted through the tempest isolation drawer 131 and multiplexer drawer 121 on data and clock lines 126d, 126e, 121d and 121e.

The telemetry regenerator of this invention can also include means for converting the regenerated data bit streams into a variety of standard IRIG-B codes to accommodate different user equipment requirements. In the system in FIG. 7, code converter 136 is connected between multiplexer drawer 121 and ports 1 and 2.

IUS telemetry regenerator 120 of the regenerator achieves the objects of the invention by regenerating individual data bit streams merged into the IUS telemetry stream at the same rate and in the same format as they were outputted by the satellite or spacecraft. Thus, the same ground test station that was used to integrate the satellite or spacecraft can also be used to monitor the satellite or spacecraft while it is connected to the IUS. The telemetry regenerator can also regenerate those satellite or spacecraft data bit streams for which the output rate is changing or different in some manner from what was expected. It performs this regeneration without adding any filler or trash bits which would interrupt the spacecraft decryption process.

To monitor the operation of telemetry portion 120 of the regenerator and to input commands, data, or new programs, CRT terminal 128 is coupled to CPU 126-3 of IUS telemetry separator 126. CRT 128 communicates with IUS telemetry separator drawer 126 via standard RS 232 lines 126f, 121f and 128a shown in FIG. 8.

Printer 129 provides a hard copy output and communicates with satellite telemetry separator drawer 126 via data and control lines 126g and 129a also shown in FIG. 8.

Figure 11:
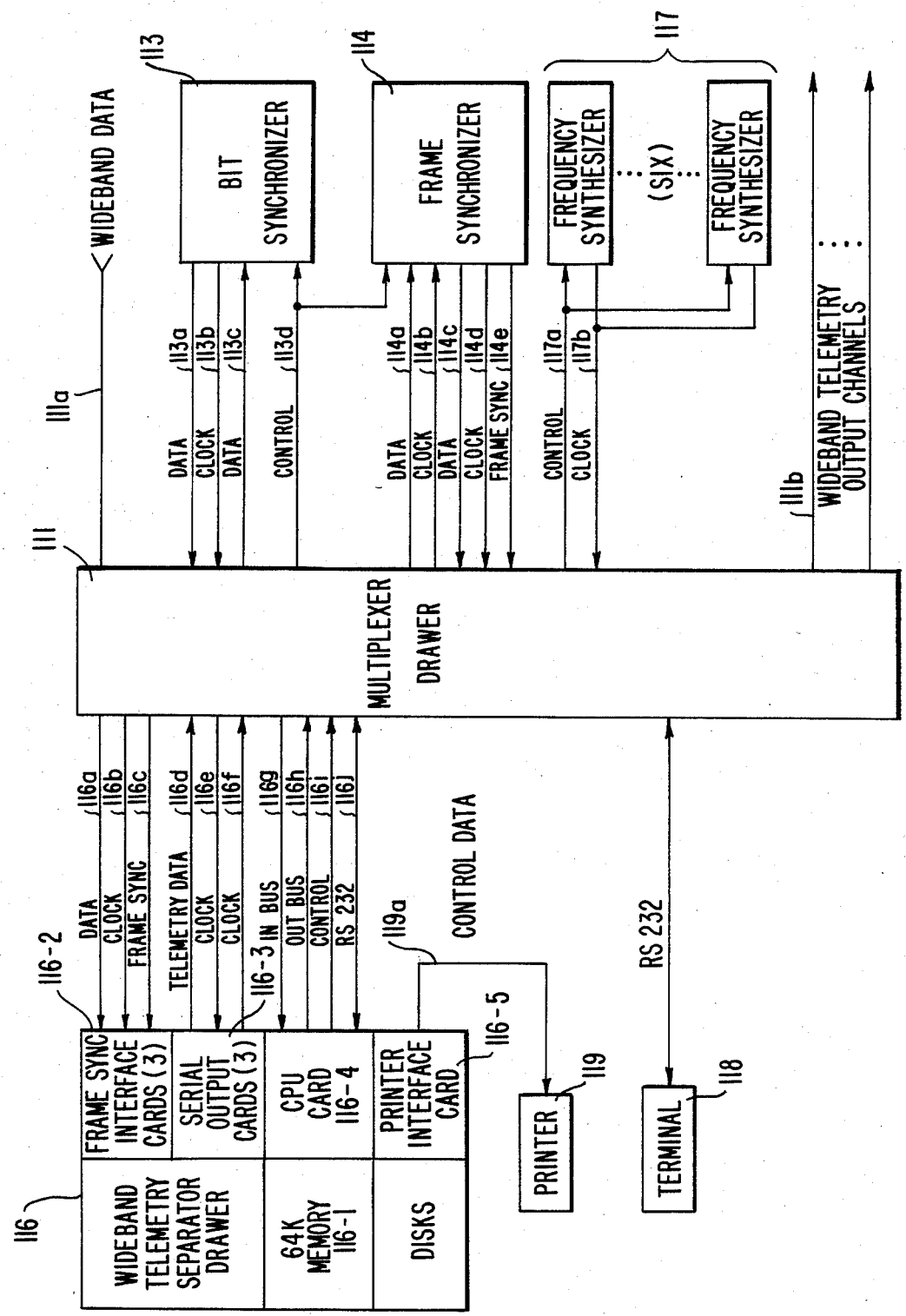
FIG. 11 is a detailed block diagram of a wideband telemetry regenerator of the telemetry regenerator in FIG. 7.
Figure 12:
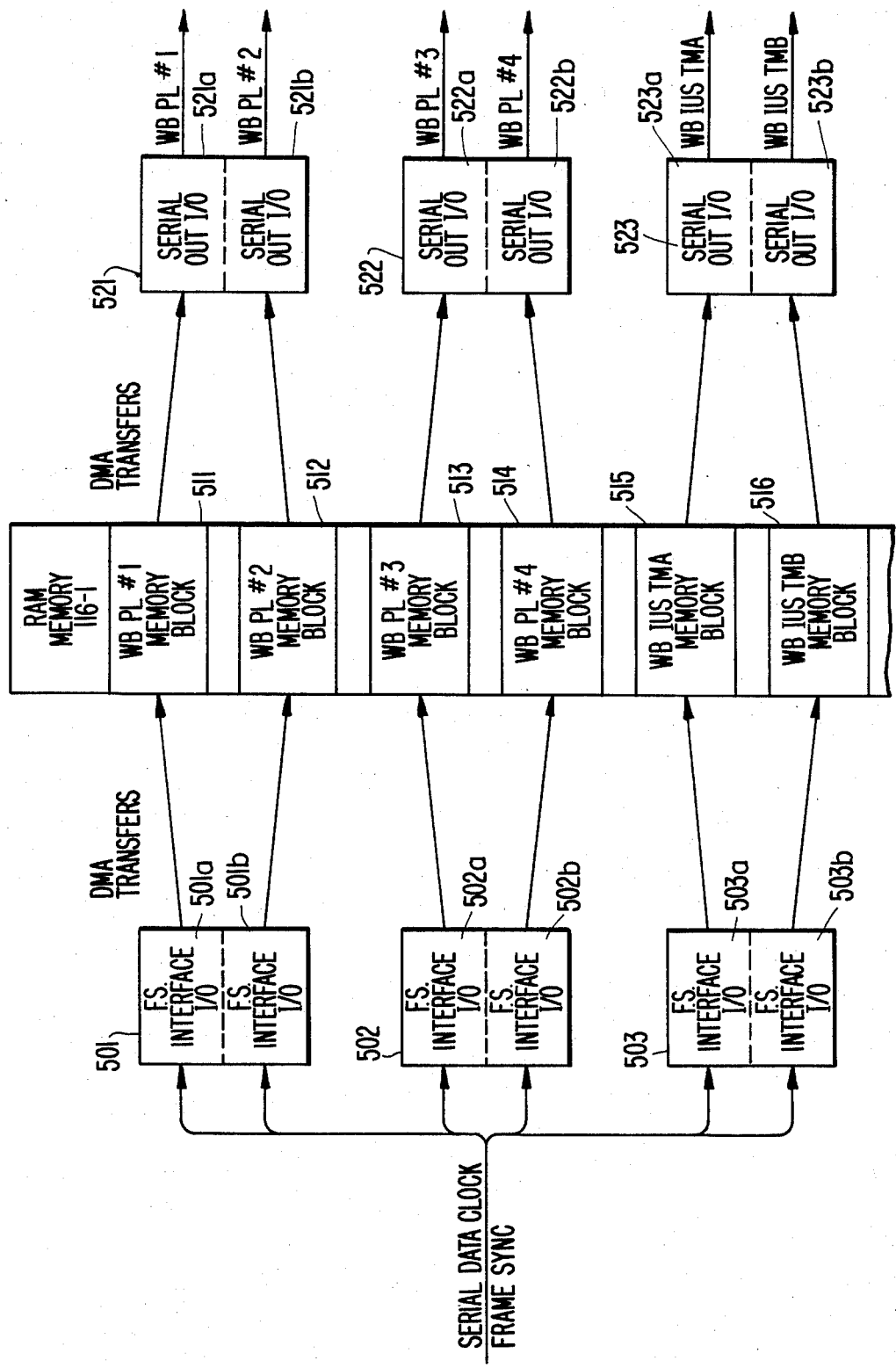
FIG. 12 shows the storage of frames of wideband telemetry data in the wideband telemetry regenerator in FIG. 11.

The wideband telemetry regenerator 110, appearing in the left-hand portion of FIG. 7 and in greater detail in FIGS. 11 and 12, operates in a somewhat different manner than does the IUS telemetry regenerator 120 just described since the IUS and WBDI telemetry streams are different. In fact, the operation of regenerator 110 can be better explained after an understanding of the WBDI operation is gained.

Figure 6:
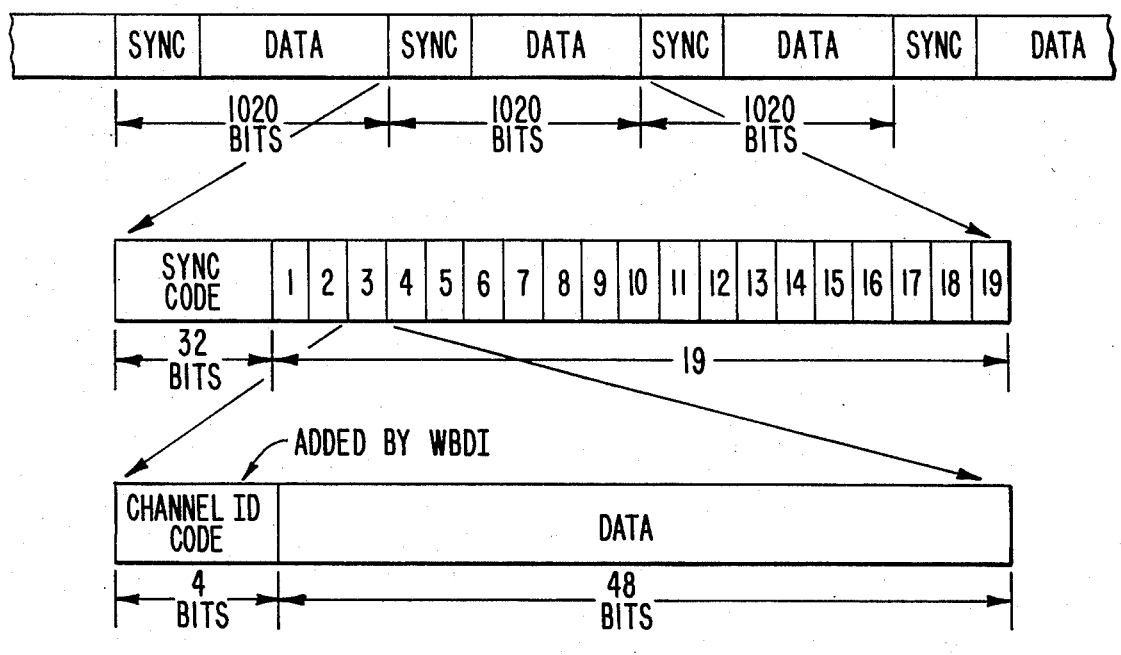
FIG. 6 shows the format for the Shuttle WBDI telemetry stream frames.

The WBDI telemetry stream shown in FIG. 6 consists of 1020 bit frames which each include a sync code and a data field. The sync code is a unique 32 bit code which identifies the beginning of a frame. The data field includes 19 data blocks or minor frames of 52 data bits. Each 52-bit minor frame contains a unique four-bit channel identification code and 48 bits of data. All 48 bits in each minor frame come from the data source identified by the four bit channel identification code in that frame.

As indicated above, the inputs to the WBDI can be either the IUS TMA or TMB streams, data streams direct from the satellites or spacecraft carried by the IUS, or data streams from any other payload carried by the Shuttle. The WBDI receives each inputted data stream 48 bits at a time, adds a four-bit identification code to indicate the source of the 48 bits, and places the entire 52-bit minor frame into the 1020-bit WBDI major frame. When 19 such minor frames have been formed, the major frame is ready for transmission.

When received from the Shuttle at the ground station, the WBDI telemetry stream must be "decoded" to separate the different telemetry streams fed into the WBDI. If telemetry regenerator 100 or wideband telemetry regenerator 110, shown in greater detail in FIG. 11, are used, the received WBDI telemetry stream is inputted via input line 111a into multiplexer drawer 111 shown in FIG. 11. Multiplexer drawer 111 routes data, control signals and telemetry streams to their correct locations.

The WBDI telemetry stream, which is in biphase-L format, is sent by multiplexer drawer 111 to bit synchronizer 113. Like bit synchronizer 123, bit synchronizer 113 first ensures that the inputted telemetry stream is synchronized with the wideband telemetry regenerator and then converts the biphase-L telemetry stream into an NRZ-L data stream (line 113a) and clock (line 113b).

Multiplexer drawer 111 connects the NRZ-L stream and clock on lines 113a and 113b to lines 114a and 114b, respectively, into frame synchronizer 114. Frame synchronizer 114 operates in a manner similar to frame synchronizer 124. Synchronizer 114 searches the inputted telemetry stream to locate the 32 bit frame sync code and ensures that the frame sync code repeats every 1020 bits, or line 414e, frame synchronizer 114 outputs a frame sync signal, which is sychronized with the frame sync code of the telemetry stream on line 114c. The clock is on line 11d.

Both frame synchronizer 114 and bit synchronizer 113 are under the control of wideband telemetry separator drawer 116 via control lines 116, and 113d.

The wideband telemetry regenerator includes frame buffers each of which corresponds to a different source of telemetry data into the WBDI. These frame buffers are contained within the 64K RAM 116-1, shown in FIG. 11, which is part of wideband telemetry separator drawer 116. These are recirculating buffers similar to the one shown in FIG. 10.

FIG. 12 shows in greater detail the portion of RAM 116-1 containing the frame buffers. For purposes of explanation, the WBDI is assumed to have 6 input sources: the IUS TMA and TMB streams and four payload streams. Each of the memory blocks 511–516, which serve as frame buffers, corresponds to a different input source.

In accordance with this invention, the wideband telemetry regenerator includes means, coupled to the telemetry stream, for storing in each of the frame buffers those data bits in the inputted telemetry stream frame from the telemetry source corresponding to that frame buffer. In the preferred embodiment, this storing means includes the frame sync interface cards 116-2 in FIG. 11. In FIG. 12, the frame sync interface cards are shown as elements 501–503 and each card contains two frame sync interface I/O sections: 501a and 501b for card 501, 502a and 502b for card 502, and 503a and 503b for card 503. Those sections each correspond to a different telemetry source into the WBDI.

Frame sync interface cards 116-2 receive from multiplexer drawer 111 a wideband telemetry stream via line 116a, a clock via line 116b, and a frame sync via line 116c. All of these signals are sent to each frame sync interface I/O section. Each frame sync interface I/O section checks the channel identification code of every minor frame in the WBDI telemetry stream major frames to determine whether that code identifies telemetry source corresponding to the particular frame sync interface I/O section. When it does, the interface I/O section stores, via DMA transfer, the 48 data bits immediately succeeding that channel identification code into the corresponding frame buffer.

The telemetry regenerator of the present invention also includes means for forming for each of the frame buffers an output data stream having the same data format and the same bit rate as the corresponding telemetry source. In the embodiment of the invention shown in FIG. 11, serial output cards 116-3 output telemetry data streams from the memory blocks on lines 116d and corresponding clocks on lines 116f using the clocks on line 116e.

The operation of the serial output cards will be explained with reference to FIG. 12 in which serial output cards 521–523 each contain two serial output I/O sections, one for each frame buffer. Serial output card 521 includes serial output I/O sections 521a and 521b, serial output card 522 includes serial output I/O sections 522a and 522b and serial output card contains serial output I/O sections 523a and 523b.

Each serial output card receives, via DMA transfer, the contents of the corresponding frame buffers. The operation of serial output cards 521–523 and of frame buffers 511–516 is similar to that of cards 321-324 and buffers 311-314 in FIG. 9. When a frame buffer has been filled sufficiently, the serial output card connected to that buffer outputs a data stream containing the data in that buffer and using a clock received from one of the frequency synthesizers 117 shown in FIGS. 7 and 11. Each of the six frequency synthesizers 117 corresponds to a different frame buffer and therefore to a different input data bit stream.

Similar to frequency synthesizers 127, each frequency synthesizer 117 generates a clock signal intended to be at the data bit rate of the corresponding telemetry source bit stream. Those clock signals are sent through multiplexer drawer 111 via lines 117b and 116f to serial output cards 116-3.

If the clock from the frequency synthesizer differs from the data rate of the corresponding telemetry source, then the size of the frame buffer will change due to different input with regard to the frequency synthesizers on the telemetry section, CPU card 116-4 monitors the sizes of the frame buffers and sends out the necessary control signals via lines 416i and 417a to adjust the frequency synthesizer clocks to maintain the frame buffer sizes constant and thereby to output the data streams as the same bit rate at which they are inputted from the corresponding telemetry source.

The wideband section of the telemetry regenerator of this invention regenerates the telemetry sources inputted to the WBDI. The regenerated data streams are on lines 111b and are either sent to output ports A or B as seen in FIG. 7, or, if the IUS telemetry stream is regenerated, that stream is inputted to the spacecraft telemetry section of the telemetry regenerator.

Similar to the spacecraft telemetry regenerator described above, the wideband telemetry section can also include means for converting the regenerated data bit streams into a variety of standard IRIG-B codes to accommodate different equipment. Such means would be connected to output lines 111b and be under the control of CPU card 116-4 in the preferred embodiment.

CPU card 116-4 can also be connected to a CRT terminal 118 via RS 232 lines 116j and 118a, the CRT terminal 118 allowing a user to monitor the operation of the wideband portion of the telemetry regenerator and to input commands, data, or new programs. A printer 116 to provide hard copy outputs of the programs in data in the wide band portion of the telemetry regenerator can be connected to the wide band telemetry separator door 116 via printer interface card 116-5 and a control/data line 119a.

It will be apparent to those skilled in the art that modifications and variations can be made in the telemetry regenerator of this invention. The invention in its broader aspects is therefore not limited to the specific details, representative methods and apparatus and illustrative examples shown and described. Accordingly, departure may be made from such details, without departing from the spirit or scope of the general inventive concept.

What is claimed is:

1. A device to regenerate asynchronous individual data bit streams, each having a particular data format and bit rate which is independent of the bit rates of others of said individual data bit streams, said individual data bit streams having been merged into a telemetry data stream having frames, said device comprising:
   (a) a frame buffer with sufficient capacity to store at least one frame of said telemetry stream;
   (b) means for storing in said frame buffer said frames of said telemetry data stream;
   (c) a plurality of individual data bit stream buffers each corresponding to a different one of said individual data bit streams;
   (d) means for sending from said frame buffer to each of said individual data bit stream buffers the data bits in the stored frames which were from the individual data bit stream corresponding to that bit stream buffer;
   (e) clock generating means coupled to said individual data stream buffers for generating from predetermined characteristics of said bit stream buffers variable rate clodk signals reflecting the bit rates of each of said individual bit streams; and
   (f) means connected to said bit stream buffers and said clock generating means for forming, for each of said individual data bit stream buffers and from said variable rate clock signals, an output data stream having the same data format and the same bit rate as the corresponding individual data bit stream, thereby to regenerate said individual data bit streams merged into said telemetry data stream.

2. The device according to claim 1 wherein said plurality of data bit stream buffers include recirculating buffers.

3. The device in claim 2 wherein said clock generating means includes means for controlling the data rates of said output data streams according to the amount of data stored in each of said data bit stream buffers.

4. The device in claim 2 wherein said frames each includes a unique frame synchronization code, said device also including a frame synchronizer connected to said storing means for detecting said frame synchronization code.

5. The device in claim 4 also including a decrypter connected to said frame synchronizer.

6. The device in claim 4 including a bit synchronizer connected to said frame synchronizer for ensuring that said device is in phase with said telemetry streams.

7. The device in claim 4 wherein said individual data bit streams may be contained in a plurality of telemetry data streams and wherein said device further includes a multiplexer connected to said plurality of streams to switch to said frame synchronizer one of said plurality of telemetry data streams.

8. The device in claim 7 further including means, connected to said output data stream forming means, for converting each of said output data streams into one of a plurality of predetermined data codes.

9. The device in claim 7 further including means connected to said multiplexer for providing security isolation for data in said individual data bit streams.

10. The device in claim 9 further including a bit synchronizer connected to said multiplexer.

11. A device to regenerate individual asynchronous data bit streams, each having a particular data format and bit rate which is independent of the bit rates of others of said individual data bit streams, said data bit streams having been merged into a telemetry stream having frames, said device comprising:
   (a) a plurality of frame buffers each corresponding to a different individual data bit stream;
   (b) means for storing in each of said frame buffers those data bits in the telemetry stream frame from the individual data bit stream corresponding to that frame buffer; and
   (c) means connected to said frame buffers for forming, for each of said frame buffers, an output data stream having the same data format and the same bit rate as the corresponding individual data bit stream, thereby to regenerate said individual data streams merged into said telemetry data stream, said output data forming means including variable rate clock generating means for generating clock signals for said buffers according to predetermined dharacteristics of said buffers.

12. The device in claim 11 wherein said telemetry streams comprise frames each of which contains a unique frame synchronization code, and wherein said device includes a frame synchronizer coupled to said storing means for detecting said frame synchronization code.

13. The device in claim 12 wherein said frames in said telemetry stream comprise minor frames, each minor frame including an identification code, and wherein said storing means includes means for comparing the identification code of each of said minor frames to identification codes for each of said plurality of frame buffers.

14. The device in claim 13 including a bit synchronizer connected to said frame synchronizer for ensuring that said device is in phase with said telemetry stream.

15. The device in claim 14 including a multiplexer connected to said bit synchronizer, said frame synchronizer, said storing means and said output data stream forming means.

16. A device to regenerate individual synchronous data bit streams, each having a particular data format and bit rate which is independent of the bit rates of others of said individual data bit streams, said data bit streams having been merged into a first telemetry data stream having frames including data bits from said individual data bit streams, said first telemetry data stream being merged into a second telemetry data stream, said device comprising:
  (a) first and second frame buffers, said second frame buffer having sufficient capacity to store at least one frame of said first telemetry data stream;
  (b) means for storing said in said first frame buffer the data bits from said second telemetry data stream words;
  (c) means connected to said first frame buffer for forming a telemetry output data stream from said first frame buffer, said telemetry output data stream having the same format and same bit rate as said first telemetry data stream;
  (f) means for storing in second frame buffer said frames of said first telemetry data stream;
  (g) a plurality of individual data bit stream buffers each corresponding to one of said individual data bit streams;
  (h) means for sending from said second frame buffer to each of said individual data stream buffers data bits from the individual data bit stream corresponding to that buffer; and
  (i) means connected to said bit stream buffers for forming, for each of said individual data bit stream buffers, an output data stream having the same data format and same bit rate as the corresponding individual data bit stream, thereby to regenerate said individual data bit streams merged into said first and second telemetry data bit streams.

17. A method of regenerating individual asynchronous data bit streams, each having a particular data format and bit rate which is independent of the bit rates of others of such individual data bit streams, said data bit streams having been merged into a telemetry data stream having frames which include data bits from said individual data streams, said method comprising the steps of:
  (a) storing in a frame buffer said frames of said telemetry data stream;
  (b) sending from said frame buffer to a plurality of individual data bit stream buffers, each corresponding to one of said individual data bit streams, the data bits in said stored frames from the individual data bit stream corresponding to that individual data bit stream buffer;
  (c) forming variable clock rate signals according to predetermined characteristics of said bit stream buffers; and
  (d) forming, for each of said individual data bit stream buffers, an output data stream having the same data format and same bit rate as the corresponding individual data bit stream by using said variable clock rate signals, thereby to regenerate said individual data bit streams merged into said telemetry data stream.

18. The method in claim 17 further including the step of initiating the output of an output data stream when the working size of said corresponding individual data bit stream buffer reaches a predetermined size, said working size representing the number of items in said buffer which have been inputted but not yet outputted.

19. The method of claim 17 further including the step of outputting each of said output data streams in one of a plurality of predetermined data codes.

20. The method of claim 17 wherein the step of sending words from said frame buffer to said data bit stream buffer includes the step of ensuring that the data bits in said frame buffer which are from an individual data bit stream are valid before they are sent to the corresponding data bit stream buffer.

21. The method in claim 17 further including the step of frame synchronizing said telemetry data stream frames before storing them in said frame buffer.

22. The method of claim 21 further including the step of decrypting said telemetry data stream.

23. The method of claim 17 further including the step of adjusting the data rates of said output data streams to equal that of the corresponding individual data bit streams.

24. The method in claim 23 wherein the step of adjusting said output data stream rates includes the step of monitoring the working sizes of said individual data bit stream buffers and transmitting data rate adjustment signals according to the working size of the corresponding individual data bit stream buffer, said working size representing the number of items in said buffer which have been inputted but not yet outputted.

25. A method of regenerating individual asynchronous data bit streams, each having a particular data format and bit rate which is independent of the bit rates of others of said individual data bit streams, said individual data bit streams having been merged into a telemetry stream having frames, said method comprising the steps of:
  (a) storing, in each of a plurality of frame buffers each corresponding to a different individual data bit stream, those data bits in said telemetry stream from the individual data bit stream corresponding to that frame buffer;
  (b) forming variable clock rate signals according to predetermined characteristics of said bit stream buffers; and
  (c) forming for each of said frame buffers, an output data stream having the same data format and bit rate as the corresponding individual data bit stream by using said variable clock signals, thereby to regenerate said individual data bit streams merged into said telemetry data stream.

26. The method in claim 25 further including the step of frame synchronizing said telemetry data stream.

27. The method in claim 26 further including the step of comparing an identification code of a minor frame of one of said frames with an identification code for one of said plurality of said frame buffers.

28. The method of claim 27 further including the step of bit synchronizing said telemetry data stream.

* * * * *